(No Model.)
H. C. GOODRICH & R. S. BARNUM.
NOISELESS SLATE.
No. 263,041. Patented Aug. 22, 1882.
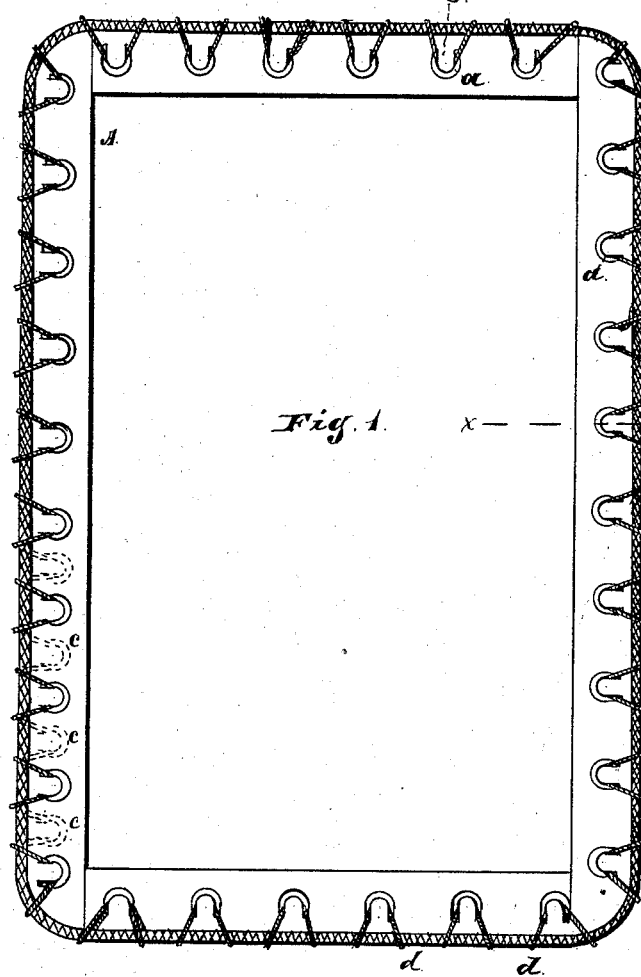
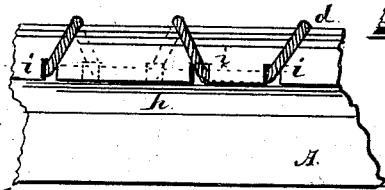
Witnesses:
Henr. T. Brins
Albert H. Adams.
Inventors:
Harry C. Goodrich
Russel S. Barnum,
By West & Bond Attys

UNITED STATES PATENT OFFICE.

HARRY C. GOODRICH AND RUSSEL S. BARNUM, OF CHICAGO, ILLINOIS, ASSIGNORS TO SAID GOODRICH.

NOISELESS SLATE.

SPECIFICATION forming part of Letters Patent No. 263,041, dated August 22, 1882.

Application filed September 27, 1881. (No model.)

*To all whom it may concern:*

Be it known that we, HARRY C. GOODRICH and RUSSEL S. BARNUM, residing at Chicago, in the county of Cook and State of Illinois, and citizens of the United States, have invented a new and useful Improvement in Noiseless Slates, of which the following is a full description, reference being had to the accompanying drawings, in which—

Figure 1 represents a plan view of a slate embodying our invention; Fig. 2, an edge view of one end of the slate; Fig. 3, a section on the line $xx$ of Fig. 1; Fig. 4, an enlarged detail view; Figs. 5, 6, 7, 8, and 9, detail views of modifications.

One method now in use for rendering slates noiseless is to apply a strip of cloth or felt to the edge of the frame, securing the same in place by means of a cord which passes through a series of holes bored near the edge of the frame, the cords being passed through the holes by hand. This is a slow process requiring considerable labor.

The object of our invention is to provide means by the use of which felt, cloth, or similar material can be secured to the edges of slate-frames by means of cords more rapidly and with less labor than at present required, which we accomplish by providing the edges of the slate-frames with a series of hooks adapted to receive and hold the cord, which hooks are made by cutting grooves or recesses in the slate-frame, as hereinafter more fully set forth.

In the drawings, A represents the frame of the slate. $a$ indicates one of a series of hooks upon the opposite sides of the frame, each of these hooks being made by cutting a semicircular recess or groove in the slate-frame, leaving a central portion, $b$, around which the cord may pass. The depth of these grooves may be equal to about one-third of the thickness of the frame, and they should be cut at a small angle, as shown in Fig. 3. The hooks upon the two opposite sides of the frame we do not locate opposite to each other. The dotted lines $c$ indicate the position of these grooves and hooks upon the side of the frame, which is opposite to that seen in Fig. 1.

B represents a strip of cloth, felt, or other suitable material over the edge of the slate-frame. $d$ is the cord which secures the same to the frame. This cord is applied by passing it around one of the hooks $a$ upon one side of the frame, then over the edge of the frame, then around the first hook upon the opposite side of the frame, then back over the edge of the frame, repeating the operation until the starting-point is arrived at. The ends of the cord are to be properly secured either by passing them under a portion of the cord or by inserting the ends in a hole or holes in the frame, and securing them by means of a pin; or the ends may be secured in some other suitable manner.

The felt or cloth B can be folded over the edge of the frame at the same time that the cord is being applied; or it may be first folded over the edge of the frame, and then be secured by small tacks. A sufficient number of hooks $a$ can be cut, using a suitable tool, in the edges of the frame, with a saving of labor over that required to bore holes, as has heretofore been done. The cord can be applied much more rapidly to the hooks than it can be inserted in the holes.

We do not limit ourselves to the exact form of hooks already shown and described, since other forms may be used, the hooks being formed by cutting into the body of the frame, without departing from our invention.

In Figs. 5, 6, and 7 we have shown one modification, in which $ee$ are grooves cut in the edge of the frame, and $ff$ are recesses cut, as shown in Fig. 5, upon one side of the frame, communicating with the groove $e$ upon that side, and $f'f'$ are corresponding recesses upon the opposite side of the frame, also communicating with the grooves $ee$ upon that side, the points $gg$ forming hooks on opposite sides of the frame to receive and hold the cord $d$. In these figures we have not shown the felt or cloth upon the edge of the frame; but the same may be used, being held by passing the cord from side to side of the frame and under the hooks $g$. When felt or cloth is used the same will cover the edges of the frame and the main portion of the grooves $e$. In this modification the cord passes over the edge of the frame between the grooves, as shown in Fig. 7, and it passes from a hook upon one side through the recess *e* to and around a hook upon the opposite side.

In Figs. 8 and 9 we have shown still another modification, in which *h h* are grooves, one upon each side of the frame, one side of which is cut under a little and the other side of which is beveled, as shown in Fig. 9. Hooks are then formed by cutting notches *i* in the edge of the groove nearest the edge of the frame, as shown in Fig. 8. In these Figs. 8 and 9 we have not shown any felt or cloth; but the same may be used. When this modification is used the cord may be applied substantially the same as when the form shown in Fig. 1 is used.

What we claim as new, and desire to secure by Letters Patent, is as follows:

1. A slate-frame provided with a series of hooks around its outer edge for receiving and retaining a muffling or binding cord, substantially as and for the purpose specified.

2. The series of hooks *a*, arranged around the edge of a slate-frame, in combination with a binding or muffling cord, *d*, intertwined in the hooks and retained in place thereby, substantially as and for the purpose specified.

3. A slate-frame, A, provided with a series of hooks, *a*, arranged around its outer edge, in combination with the muffling material B and the binding-cord *d*, substantially as and for the purpose specified.

HARRY C. GOODRICH.
RUSSEL S. BARNUM.

Witnesses:
ALBERT H. ADAMS,
E. T. BOND.